US012686297B2

(12) United States Patent
Ahmed et al.

(10) Patent No.: US 12,686,297 B2
(45) Date of Patent: Jul. 21, 2026

(54) SWITCHABLE CONDUCTION MODE FOR BATTERY STATE CONTROL

(71) Applicant: GM Global Technology Operations LLC, Detroit, MI (US)

(72) Inventors: Mohamed Ahmed Kamel Ahmed, Birmingham, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 680 days.

(21) Appl. No.: 18/304,003

(22) Filed: Apr. 20, 2023

(65) Prior Publication Data

US 2024/0351473 A1 Oct. 24, 2024

(51) Int. Cl.
| | |
|---|---|
| *H02J 7/00* | (2026.01) |
| *B60L 58/18* | (2019.01) |
| *H02J 7/34* | (2006.01) |
| *H02J 7/80* | (2026.01) |
| *H02J 7/90* | (2026.01) |
| *H02P 23/14* | (2006.01) |
| *H02P 27/08* | (2006.01) |

(52) U.S. Cl.
CPC .............. *B60L 58/18* (2019.02); *H02J 7/342* (2020.01); *H02J 7/80* (2026.01); *H02J 7/933* (2026.01); *H02P 23/14* (2013.01); *H02P 27/085* (2013.01); *Y02T 10/70* (2013.01)

(58) Field of Classification Search
CPC ... H02J 7/342; H02J 7/80; H02J 7/933; H02P 23/14; H02P 27/085; Y02T 10/70; B60L 58/18
USPC ........................... 320/103, 104, 109; 701/22
See application file for complete search history.

(56) References Cited

U.S. PATENT DOCUMENTS

| | | | |
|---|---|---|---|
| 2015/0015064 A1* | 1/2015 | Wu ......................... | B60L 50/51 |
| | | | 307/10.1 |
| 2017/0222641 A1* | 8/2017 | Zou ........................ | B60L 15/007 |
| 2020/0298722 A1* | 9/2020 | Smolenaers ............ | B60L 53/24 |
| 2022/0181907 A1* | 6/2022 | Kasper ................... | H02J 7/345 |

* cited by examiner

*Primary Examiner* — Zixuan Zhou
(74) *Attorney, Agent, or Firm* — CANTOR COLBURN LLP

(57) ABSTRACT

An electric vehicle, system and method of charge transfer at the electric vehicle. The vehicle includes a charging circuit and a processor. The charging circuit includes a first battery, a second battery and a motor winding. The processor determines a desired reference current of the motor winding, a first voltage of the first battery and a second voltage of the second battery, calculates a power loss for each of a plurality of conduction modes based on the desired reference current, the first voltage and the second voltage, wherein each of the plurality of conduction modes transfers charge between the first battery and the second battery, selects a conduction mode from the plurality of conduction modes that has a least power loss, establishes a duty cycle parameter for the selected mode, and applies the conduction mode and the duty cycle parameter to the charging circuit to transfer the charge.

20 Claims, 7 Drawing Sheets

200

300

400

SWITCHABLE CONDUCTION MODE FOR BATTERY STATE CONTROL

INTRODUCTION

The subject disclosure relates to transferring charge between batteries in electric vehicles and, in particular, to a system and method for selecting a charging mode between a first battery and a second battery or a second power source that minimizes or reduces power loss during the charge transfer.

Electric vehicles rely on batteries to provide power. Generally, an electric vehicle includes multiple batteries and often draws unevenly from them. As a result, over time, the charge on one battery can be low while the charge on another battery can be high. For reliable operation of the electric vehicle, it is desirable to have the charges on the multiple batteries to be within a reasonable range of each other. Methods can therefore be performed to transfer charge between the batteries. However, power loss becomes an issue during charge transfer. Accordingly, it is desirable to provide a system and method for transferring charge between batteries that minimizes this power loss.

SUMMARY

In one exemplary embodiment, a method of transferring charge between a first battery and a second battery of an electric vehicle is disclosed. A desired reference current of an inductor, a first voltage of the first battery and a second voltage of the second battery are determined, wherein the first battery, the second battery and a motor winding are included in a charging circuit. A power loss is calculated for each of a plurality of conduction modes based on the desired reference current, the first voltage and the second voltage, wherein each of the plurality of conduction modes transfers charge between the first battery and the second battery. A conduction mode is selected from the plurality of conduction modes that has a least power loss. A duty cycle parameter is established for the selected conduction mode. The conduction mode and the duty cycle parameters are applied to the charging circuit to transfer the charge.

In addition to one or more of the features described herein, the method further includes calculating the power loss for each of the plurality of conduction modes at a plurality of switching cycle frequencies for a switching cycle and selecting the conduction mode and a switching cycle frequency at which the least power loss occurs. The method further includes applying a voltage gain to a difference between a reference voltage and a feedback voltage, wherein the voltage gain is dependent on the selected conduction mode. The method further includes using a lookup table to determine a modified reference current and a current control gain, based on the desired reference current, the first voltage and the second voltage. The method further includes determining a difference between the modified reference current and a feedback current and applying the current control gain to the difference to establish the duty cycle parameter. The current control gain is dependent on the conduction mode of the motor winding. The plurality of conduction modes includes at least one of a discontinuous charging mode, a boundary charging mode, and a continuous charging mode.

In another exemplary embodiment, a system for transferring charge between a first battery and a second battery of an electric vehicle is disclosed. The system includes a charging circuit and a processor. The charging circuit includes the first battery, the second battery and a motor winding. The processor is configured to determine a desired reference current of the motor winding, a first voltage of the first battery and a second voltage of the second battery, calculate a power loss for each of a plurality of conduction modes of the motor winding based on the desired reference current, the first voltage and the second voltage, wherein each of the plurality of conduction modes transfers charge between the first battery and the second battery, select a conduction mode from the plurality of conduction modes that has a least power loss, establish a duty cycle parameter for the selected conduction mode, and apply the conduction mode and the duty cycle parameter to the charging circuit to transfer the charge.

In addition to one or more of the features described herein, the processor is further configured to calculate the power loss for each of the plurality of conduction modes at a plurality of cycle frequencies for a switching cycle and select the conduction mode and a switching cycle frequency at which the least power loss occurs. The processor is further configured to apply a voltage gain to a difference between a reference voltage and a feedback voltage, wherein the voltage gain is dependent on the selected conduction mode. The processor is further configured to use a lookup table to determine a modified reference current and a current control gain, based on the desired reference current, the first voltage and the second voltage. The processor is further configured to determine a difference between the modified reference current and a feedback current and apply the current control gain to the difference to establish the duty cycle parameter. The current control gain is dependent on the conduction mode. The plurality of conduction modes includes at least one of a discontinuous charging mode, a boundary charging mode, and a continuous charging mode in a motor winding current.

In yet another exemplary embodiment, a vehicle is disclosed. The vehicle includes a charging circuit and a processor. The charging circuit includes a first battery, a second battery and a motor winding. The processor is configured to determine a desired reference current of the motor winding, a first voltage of the first battery and a second voltage of the second battery, calculate a power loss for each of a plurality of conduction modes based on the desired reference current, the first voltage and the second voltage, wherein each of the plurality of conduction modes transfers charge between the first battery and the second battery, select a conduction mode from the plurality of conduction modes that has a least power loss, establish a duty cycle parameter for the selected conduction mode, and apply the conduction mode and the duty cycle parameter to the charging circuit to transfer the charge.

In addition to one or more of the features described herein, the processor is further configured to calculate the power loss for each of the plurality of conduction modes at a plurality of switching cycle frequencies for a switching cycle and select the conduction mode and a switching cycle frequency at which the least power loss occurs. The processor is further configured to apply a voltage gain to a difference between a reference voltage and a feedback voltage, wherein the voltage gain is dependent on the selected conduction mode. The processor is further configured to use a lookup table to determine a modified reference current and a current control gain, based on the desired reference current, the first voltage and the second voltage. The processor is further configured to determine a difference between the modified reference current and a feedback current and apply the current control gain to the difference to establish the duty cycle parameter. The current control gain is dependent on the conduction mode of the motor winding.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
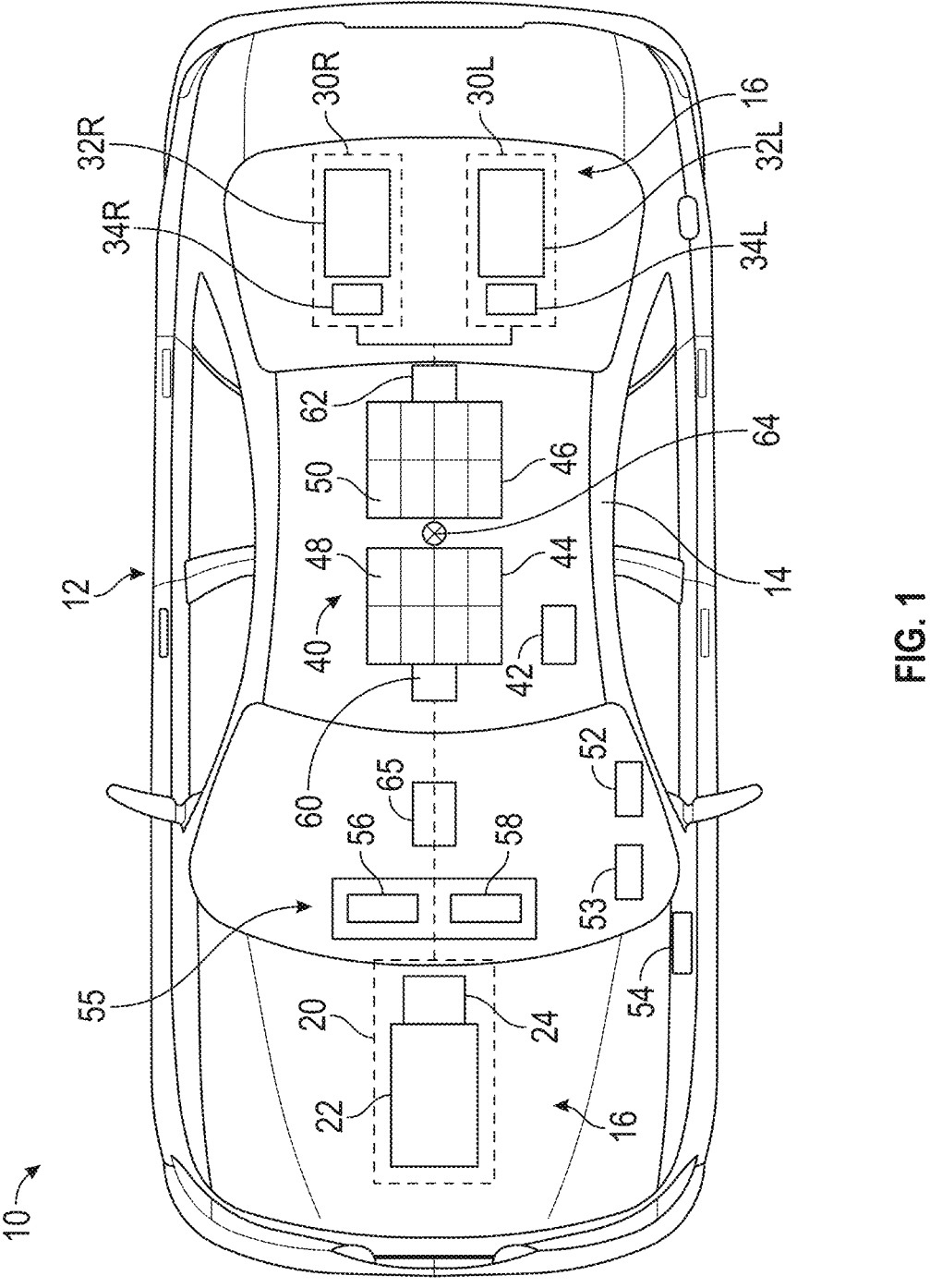
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 and rear electric motors 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery, as described herein with respect to FIGS. 2-4.

Each of the front electric motor 22 and the rear electric motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects the first battery pack 44 to the inverters 24, 34L and 34R, and a second switching device 62 that selectively connects the second battery pack 46 to the inverters 24, 34L and 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller 65 includes any suitable processing device or unit, and may use an existing controller such as a drive system controller, an RESS controller, and/or controllers in the drive system. For example, a controller 65 may be included for controlling switching and drive control operations as discussed herein.

The controller 65 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 65 may include a non-transitory computer-readable medium that stores instructions which, when processed by one or more processors of the controller 65, implement a method of selecting a charging mode for transferring charge between batteries that minimizes power loss.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

Figure 2:
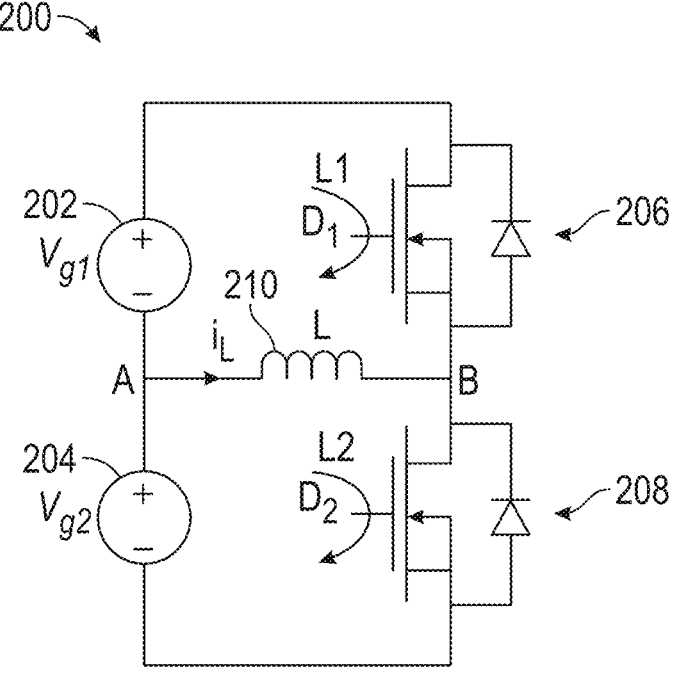
FIG. 2 shows a first charging circuit for transferring charge between batteries, in an illustrative embodiment.

FIG. 2 shows a first charging circuit 200 for transferring charge between batteries, in an illustrative embodiment. The first charging circuit 200 includes a first battery 202 and a second battery 204 in series with each other. The charge can be transferred either from the first battery 202 to the second battery 204 or vice versa. For illustrative purposes, the first battery 202 is selected to be a source battery and the second battery 204 is selected to be a receiving battery, where the charge is transferred from the source battery to the receiving battery. A first switch 206 and a second switch 208 are in series with each other along an outer loop including the first battery and 202 and the second battery 204. The first switch 206 and the second switch 208 can be solid-state switches including a transistor in parallel with a diode extending across the transistor from a drain of the transistor to a source of the transistor. The controller 65 can provide a control signal at a gate of a transistor to open or close the switch. The transistor can be a field effect transistor (FET) in various embodiments. An inductor 210 in series with a switch (not shown) join a midpoint A between the first battery 202 and the second battery 204 to a midpoint B between the first switch 206 and the second switch 208 to form a first loop L1 and a second loop L2. The first switch 206 and the second switch 208 can be opened and closed to coordinate current flow through a first loop L1 and a second loop L2. In this exemplary embodiment, the inductor represents one or more of the motor windings.

Figure 3:
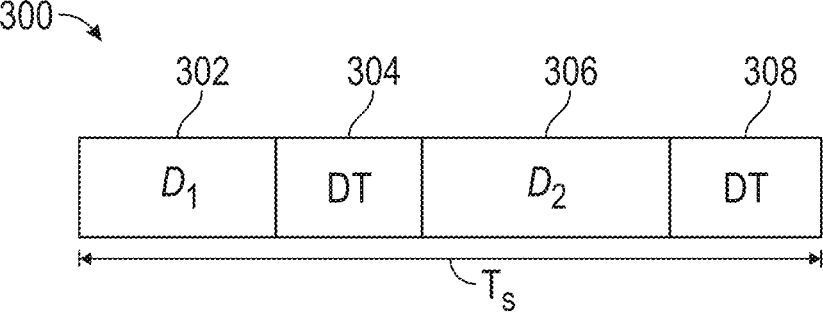
FIG. 3 shows a switching cycle for the first charging circuit of FIG. 2, in an illustrative embodiment.

FIG. 3 shows a switching cycle 300 for the first charging circuit 200 of FIG. 2, in an illustrative embodiment. The switching cycle 300 extends over a charging period $T_s$ and includes duty cycle parameters of the switching cycle, including a charging period D1 302 during which the inductor 210 is energized, a discharge period D2 306 during which the inductor is discharged or de-energized, dead-time period DT 304 between the charging period D1 and discharge period D2, and dead-time period DT 308 between charging period D2 and charging period D1 of the subsequent cycle.

To transfer charge from the first battery 202 to the second battery 204, during the charging period D1 302, the controller 65 issues a command to the first switch 206 and the second switch 208 to establish the first loop L1 (i.e., closing the first switch 206 and opening the second switch 208). The first loop L1 includes the first battery 202 and the inductor 210. While the first loop L1 is established, the first battery 202 charges or energizes the inductor 210. For the subsequent dead-time period DT 304, the controller issues a command to open the first switch 206 and open the second switch 208. The current running through the inductor 210 during the charging period D1 302 may continue flowing through the first loop L1 during the dead-time period DT due to diode of the second switch 208. For the discharge cycle D2 306, the controller 65 issues a command to establish the second loop L2 (i.e., opening the first switch 206 and closing the second switch 208). The second loop L2 includes the second battery 204 and the inductor 210. While the second loop L2 is established, the inductor 210 discharges current to the second battery 208, thereby transferring the energy stored in the inductor 210 to the second switch 204. For the subsequent dead-time period DT 308, the controller 65 issues a command to open the first switch 206 and the second switch 208. The cycle can be repeated until a desired voltage or state of charge is established at the first battery 202 and second battery 204.

Figure 4:
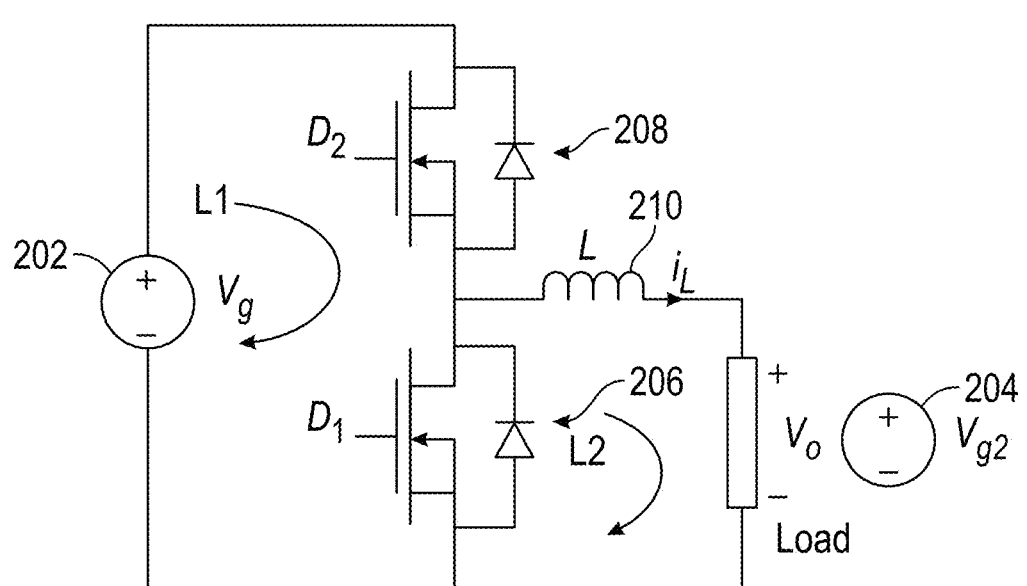
FIG. 4 shows a second charging circuit for transferring charge between batteries, in an illustrative embodiment.

FIG. 4 shows a second charging circuit 400 for transferring charge between batteries, in an illustrative embodiment. The second charging circuit 400 includes a first battery 202 and a second battery 204, representing a source battery and a receiving battery, respectively. The first battery 202 can be a power battery or a charger and the second battery 204 can be a load battery or a charger. A first switch 206 and a second switch 208 are in series with each other along a first loop L1 that includes the first battery 202. An inductor 210 connects the second battery 204 to a midpoint between the first switch 206 and the second switch 208 to, forming a second loop L2 that includes the second battery, the inductor and the second switch. A switching cycle similar to that shown in FIG. 3 can be used to control operation of the switches of the second control circuit 400 to allow transfer of charge from the source battery to the receiving battery.

Figures 5, 6, 7, 8:
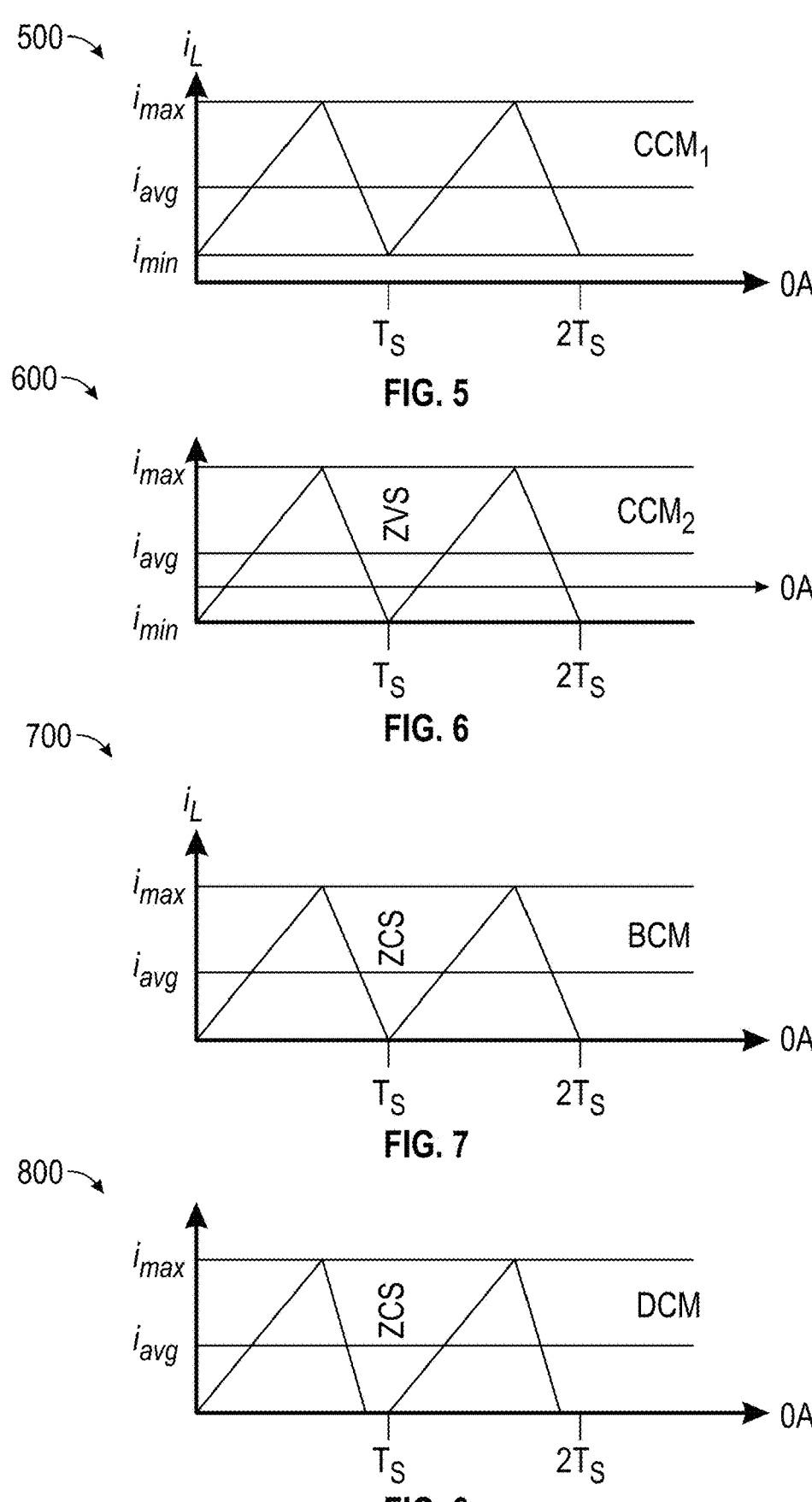
FIG. 5 shows a graph of an inductor current over time during a charging cycle for the circuits shown in FIG. 2 and FIG. 4.
FIG. 6 shows a graph of inductor current over time during a second continuous conduction mode (CCM2)
FIG. 7 shows a graph of inductor current over time during a boundary conduction mode (BCM)
FIG. 8 shows a graph of inductor current over time during a discontinuous conduction mode (DCM)

FIG. 5 shows a graph 500 of an inductor current over time during a charging cycle for the circuits shown in FIG. 2 and FIG. 4. Time (t) is shown along the abscissa, while current (A) is shown along the ordinate axis. The first embodiment shows a behavior of the inductor current for a first continuous conduction mode (CCM1). In the first continuous conduction mode, the inductor current oscillates between minimum current $I_{min}$ and a maximum current $I_{max}$, both of which are positive values. The inductor current $i_L$ rises linearly from the minimum current $I_{min}$ to the maximum current $I_{max}$ during the charging period D1 and then falls linearly back to the minimum current $I_{min}$ during the discharge period D2, reaching the minimum current at the end of the switching cycle. The maximum current $I_{max}$ and the minimum current $I_{min}$ are responsible for defining an average inductor current $I_{avg}$. The average inductor current $I_{avg}$ is proportional to the amount of charge that is transferred between the first battery 202 and the second battery 204 during the switching cycle. A power loss through the inductor 210 can be calculated for the switching cycle. The power loss is a function of root-mean-square current $I_{rms}$, a peak-to-peak current ($I_{pk-pk}=I_{max}-I_{min}$) and a duration or period $T_s$ of the charging cycle.

FIG. 6 shows a graph 600 of inductor current over time during a second continuous conduction mode (CCM2). Time (t) is shown along the abscissa, while current (A) is shown along the ordinate axis. In the second continuous conduction mode, the inductor current $i_L$ oscillates between minimum current $I_{min}$ and a maximum current $I_{max}$, with the minimum current $I_{min}$ being a negative value and the maximum current $I_{max}$ being a positive value.

FIG. 7 shows a graph 700 of inductor current over time during a boundary conduction mode (BCM). Time (t) is shown along the abscissa, while current (A) is shown along the ordinate axis. In the boundary conduction mode, the maximum current $I_{max}$ is a positive value while the minimum current $I_{min}$ is set at zero.

FIG. 8 shows a graph 800 of inductor current over time during a discontinuous conduction mode (DCM). Time (t) is shown along the abscissa, while current (A) is shown along the ordinate axis. The discontinuous conduction mode is similar to the boundary conduction mode shown in FIG. 7 in that $I_{min}$ is zero. However, in FIG. 8, the inductor current remains at zero value for an extended period of time.

Each of the switching cycles shown in FIGS. 5-8 have different average and RMS currents, and therefore have different power losses. The average and RMS currents can be affected by the shape of the waveform, which can be affected by the duration of the duty cycle parameters (e.g., D1, D2, DT). Therefore, the duty cycle parameters can be selected or adjusted to achieve different power losses for a given charging mode.

Figure 9:
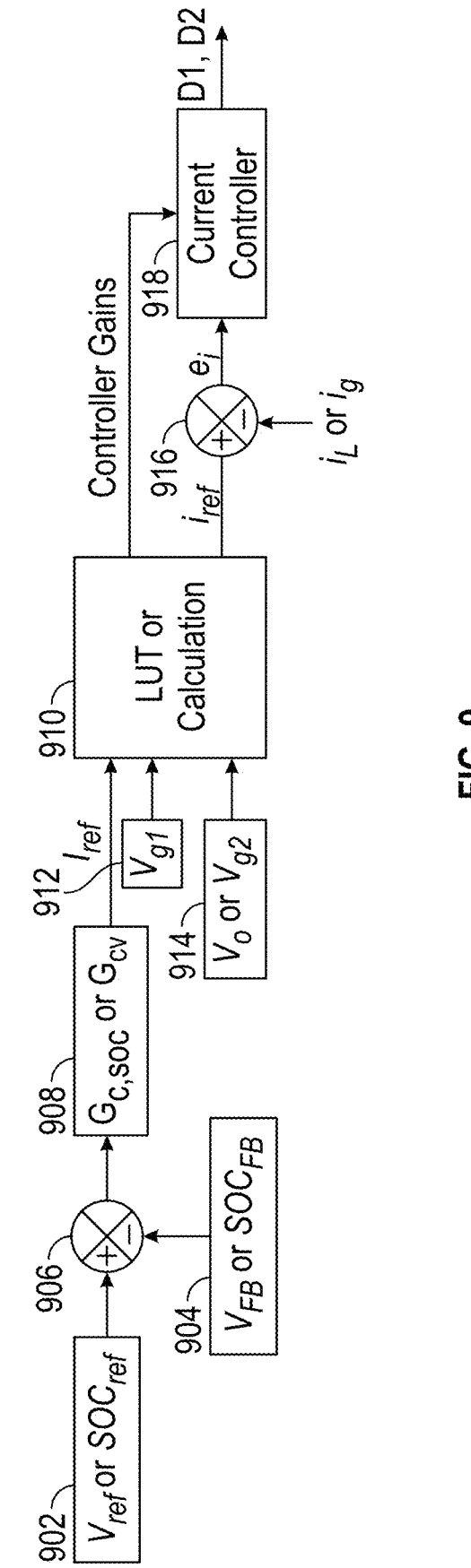
FIG. 9 shows a feedback diagram for evaluating duty cycle parameters of DCM.

FIG. 9 shows a feedback diagram 900 for evaluating duty cycle parameters D1 and D2. Input variables include a reference voltage 902 $V_{ref}$ and a feedback voltage 904. The reference voltage 902 indicates a desired voltage at the receiving battery and the feedback voltage indicates the present voltage at the receiving battery. A first difference calculator 906 calculates a voltage error value as a difference between the reference voltage $V_{ref}$ and the feedback voltage $V_{FB}$. The voltage error value is sent to a voltage control gain calculator 908. The voltage gain control calculator 908 outputs a reference current $I_{ref}$ based on the difference between the reference voltage $V_{ref}$ and the feedback voltage $V_{FB}$. The reference current $I_{ref}$ can be a peak inductor current, an average inductor current, average current at the source battery, or average current at the load batter. In alternative embodiments, a reference state of charge (SOC$_{ref}$) and a feedback state of charge (SOC$_{FB}$) can be used to determine the reference current, instead of the reference voltage and the feedback voltage.

A current control gain calculator 910 receives the reference current $I_{ref}$, the source voltage 912 of the source battery (e.g., $V_{g1}$) and the receiving voltage 914 of the receiving battery (e.g., $V_o$ or $V_{g2}$) as input. The current control gain calculator 910 outputs current control gains and a modified reference current $i_{ref}$, which can be peak inductor current, an average inductor current, average current at the source battery, or average current at the load batter. The current control gains that are output depends on the selected charging mode (i.e., DCM, BCM, CCM). In an embodiment, the current control gain calculator 910 can store or refer to a lookup table and can use the input at the lookup table to generate the output. Alternatively, the input can be used at an equation to calculate the output.

A second difference calculator 916 compares the modified reference current $i_{ref}$ to feedback values (or current values) of the inductor current or of the source current to calculate a current error value $e_i$ that is a difference between the modified reference current and the feedback current. The modified reference current $i_{ref}$ and the current controller gains are sent to a current controller 918 which generates or evaluates duty cycle parameters (i.e., D1, D2, etc.) The duty cycle parameters can then be applied in a charging cycle to create the waveform for the inductor current for the selected charging mode.

Figure 10:
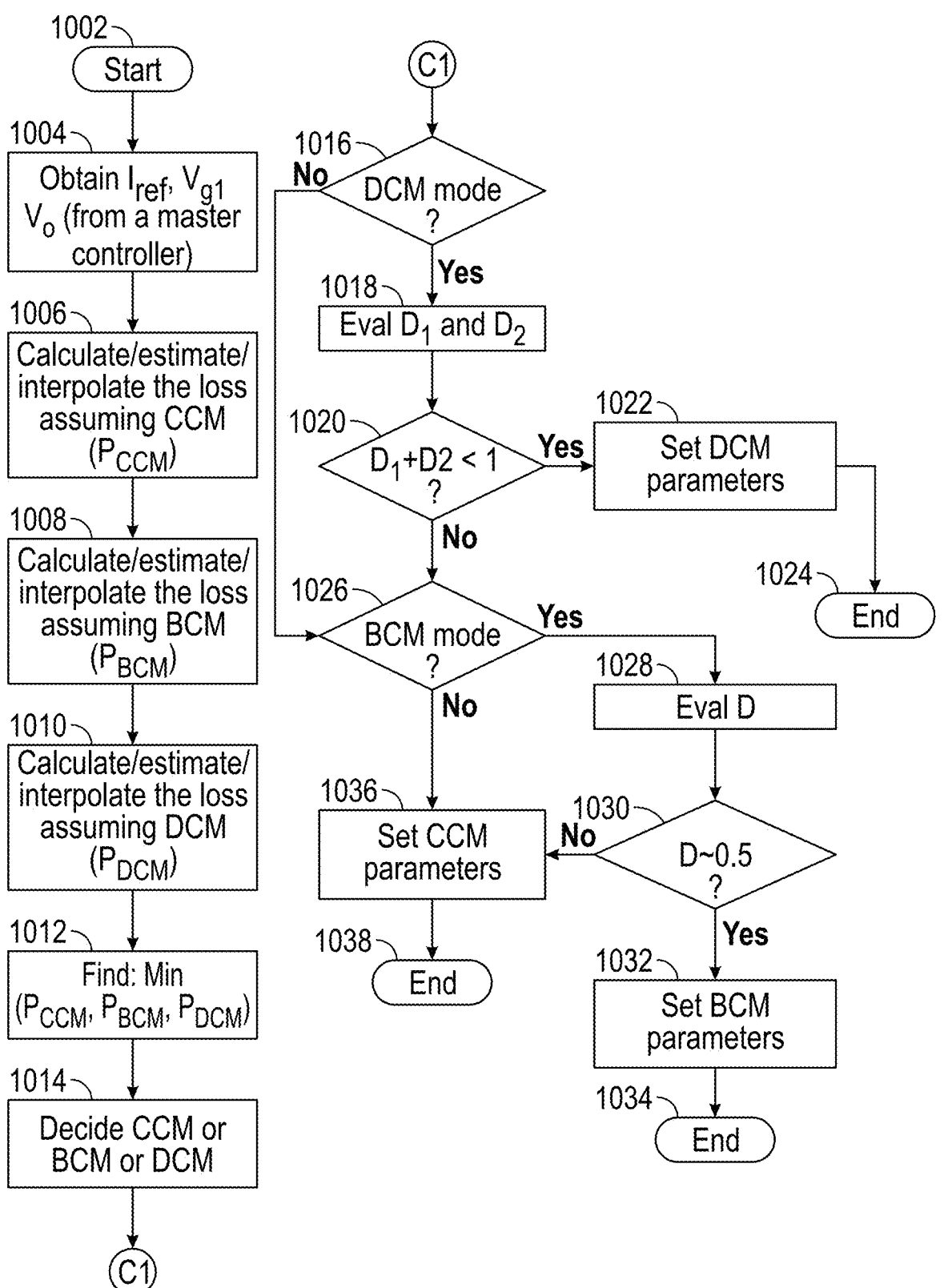
FIG. 10 shows a flowchart of a method for selecting and setting parameter for a charging mode using fixed switching frequency.

FIG. 10 shows a flowchart 1000 of a method for selecting and setting parameter for a charging mode using fixed switching frequency. The method begins in box 1002. In box 1004, electrical parameters are obtained, including a reference current, a first voltage of the first battery and a second voltage of a second battery. In box 1006, the power loss for a continuous conduction mode (CCM) is calculated using the electrical parameters. In box 1008, the power loss for a boundary conduction mode (BCM) is calculated using the electrical parameters. In box 1010, the power loss for a discontinuous conduction mode (DCM) is calculated using the electrical parameters. In box 1012, a minimum power loss or least power loss is determined that is the minimum of the power losses for the CCM (calculated in box 1006), the BCM (calculated in box 1008), and the DCM (calculated in box 1010). In box 1014, the charging mode is selected from the CCM, BCM, and DCM. The charging mode is selected that has the least power loss of the modes.

In box 1016, a query is made to determine if the selected charging mode is the DCM mode. If the selected mode is the DCM mode, the method proceeds to box 1018. In box 1018, the duty cycle parameters D1 and D2 for DCM are evaluated using, for example, the method outlined in the feedback diagram 900. In box 1020, the sum of D1 and D2 is compared to the value 1. If D1+D2<1, the method proceeds to box 1022. In box 1022, the DCM charging parameters (e.g., $I_{max}$, or $I_{arg}$, and the controller parameters for DCM mode) are set. The method then proceeds to box 1024, where the method ends.

From box 1016 or box 1020, the method can proceed to box 1016. From box 1016, if the selected mode is not the DCM mode, the method proceeds to box 1026. From box 1020, if the sum of D1 and D2 is equal to or greater than 1, the method proceeds to box 1026.

In box 1026, a query is made to determine if the selected charging mode is BCM. If the selected charging mode is BCM, the method proceeds to box 1028. In box 1028, the value of D is evaluated, wherein D~D1~D2 for BCM. In box 1030, D is compared to 0.5. If D is about 0.5, the method proceeds to box 1032. In box 1032, the BCM charging parameters are set (e.g., $I_{max}$, $I_{avg}$, and the controller gains for BCM). The method then proceeds to box 1034, where the method ends.

From box 1026 or box 1030, the method can proceed to box 1036. From box 1026, if the selected mode is not the BCM mode, the method proceeds to box 1036. From box 1020, if D is not about 0.5, the method proceeds to box 1036.

In box 1036, the CCM charging parameters are set (e.g., $I_{max}$, $I_{min}$, $I_{avg}$ and the controller gain parameters for CCM). The method then proceeds to box 1038, where the method ends.

Figure 11:
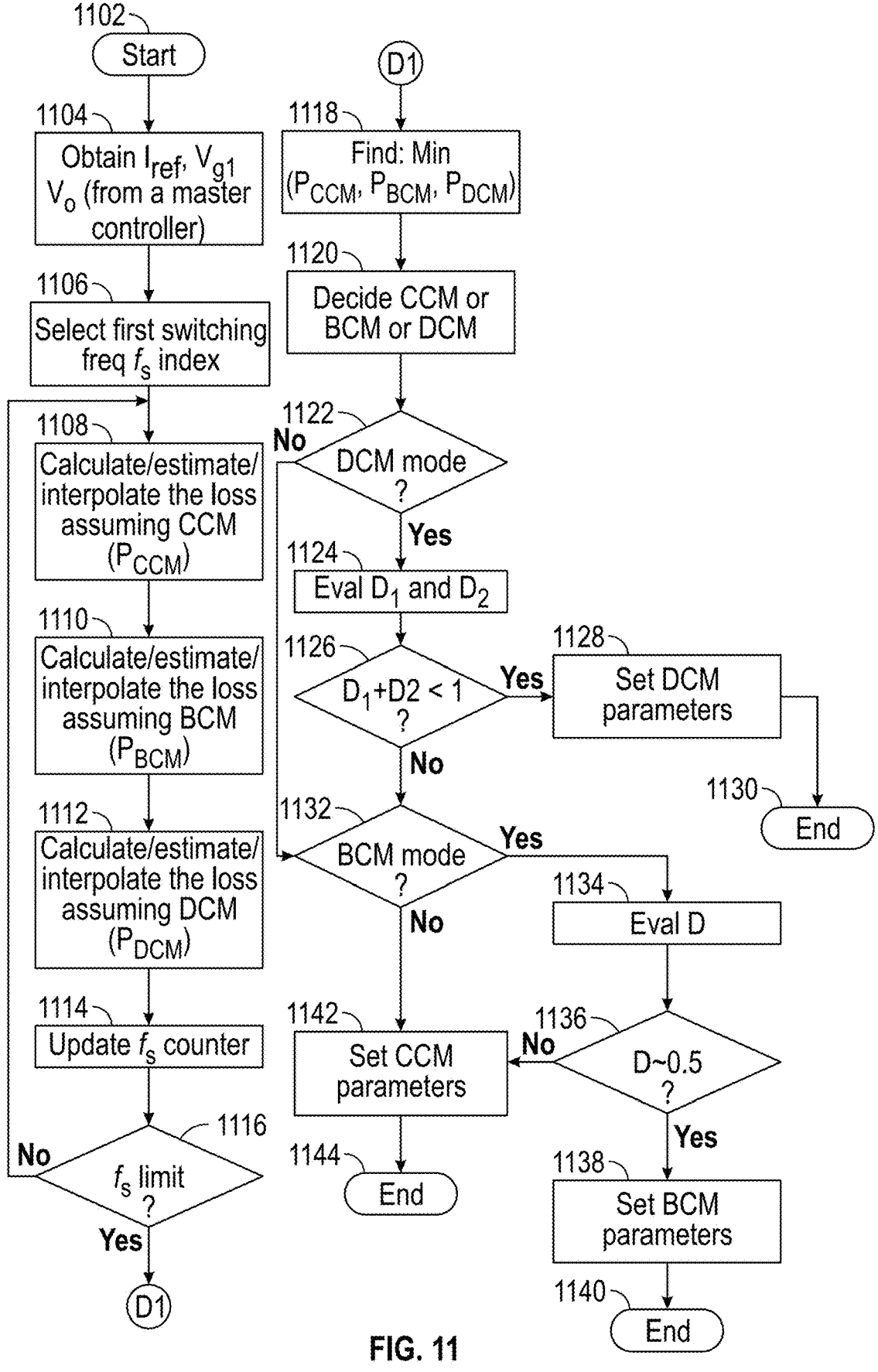
FIG. 11 shows a flowchart of a method for selecting and setting parameter for a charging mode using variable switching frequency.

FIG. 11 shows a flowchart 1100 of a method for selecting and setting parameter for a charging mode using variable switching frequency. The method includes determining power losses for a plurality of charging modes and a plurality of switching cycle frequencies and selecting the charging mode and the switching cycle frequency for which the least power loss occurs.

The method begins in box 1102. In box 1104, electrical parameters are obtained, including a reference current, a first voltage of the first battery and a second voltage of a second battery. In box 1106, a first index of switching frequency $f_s$ is selected. The switching frequency $f_s$ is related to the switching period $T_s$ (i.e., $f_s=1/T_s$). The index of the switching frequency is a value from 1 to N. For a first iteration through the flowchart 1100, a first switching frequency is selected (i.e., set $f_s=f_1$).

In box 1108, the power loss for a continuous conduction mode (CCM) at the selected switching frequency is calculated using the electrical parameters. In box 1110, the power loss for a boundary conduction mode (BCM) at the current switching frequency is calculated using the electrical parameters. In box 1112, the power loss for a discontinuous conduction mode (DCM) at the current switching frequency is calculated using the electrical parameters. In box 1114, the frequency counter fs is updated by incrementing the index of the frequency. In box 1116, the switching frequency fs is compared to a frequency limit. If the switching frequency is not at the frequency limit, the method returns to box 1106 in which the frequency fs is updated. If the switching frequency is at the frequency limit, the method proceeds to box 1118.

In box 1118, a minimum power loss or least power loss is determined that is the minimum of the power losses for the CCM (calculated in box 1108) at each switching frequency, the BCM (calculated in box 1110) at each switching frequency, and the DCM (calculated in box 1112) at each switching frequency. In box 1120, the charging mode and frequency are selected for a charging mode (e.g., CCM, BCM, and DCM) and a selected frequency. The charging mode and switching frequency are selected for which the power loss is the least.

In box 1122, a query is made to determine the if selected charging mode is the DCM mode. If the selected mode is the DCM mode, the method proceeds to box 1124. In box 1124, the duty cycle parameters D1 and D2 for DCM are evaluated using, for example, the method outlined in the feedback diagram 900. In box 1126, the sum of D1 and D2 is compared to the value 1. If D1+D2<1, the method proceeds to box 1128. In box 1128, the DCM parameters are set. The method then proceeds to box 1130, where the method ends.

From box 1122 or box 1126, the method can proceed to box 1132. From box 1122, if the selected mode is not the DCM mode, the method proceeds to box 1132. Additionally, in box 1126, if the sum of the D1 and D2 is equal to or greater than 1, the method proceeds to box 1132.

In box 1132, a query is made to determine if the selected charging mode is BCM. If the selected charging mode is the BCM, the method proceeds to box 1134. In box 1134, the value of D is evaluated, where D~D1~D2 for BCM. In box 1136, D is compared to 0.5. If D is about 0.5, the method proceeds to box 1138. In box 1138, the BCM charging parameters are set. The method then proceeds to box 1140, where the method ends.

From box 1132 or box 1136, the method can proceed to box 1142. From box 1132, if the selected charging mode is not the BCM mode, the method proceeds to box 1142. From box 1136, if D is not about 0.5, the method proceeds to box 1142.

In box 1142, the CCM parameters are set. The method then proceeds to box 1144, where the method ends.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of transferring charge between a first battery and a second battery of an electric vehicle, comprising:

determining a desired reference current of an inductor, a first voltage of the first battery and a second voltage of the second battery, wherein the first battery, the second battery and a motor winding are included in a charging circuit;

calculating a power loss for each of a plurality of conduction modes based on the desired reference current, the first voltage and the second voltage, wherein each of the plurality of conduction modes transfers charge between the first battery and the second battery;

selecting a conduction mode from the plurality of conduction modes that has a least power loss;

establishing a duty cycle parameter for the selected conduction mode; and apply the conduction mode and the duty cycle parameters to the charging circuit to transfer the charge.

2. The method of claim 1, further comprising calculating the power loss for each of the plurality of conduction modes at a plurality of switching cycle frequencies for a switching cycle and selecting the conduction mode and a switching cycle frequency at which the least power loss occurs.

3. The method of claim 1, further comprising applying a voltage gain to a difference between a reference voltage and a feedback voltage, wherein the voltage gain is dependent on the selected conduction mode.

4. The method of claim 1, further comprising using a lookup table to determine a modified reference current and a current control gain, based on the desired reference current, the first voltage and the second voltage.

5. The method of claim 4, further comprising determining a difference between the modified reference current and a feedback current and applying the current control gain to the difference to establish the duty cycle parameter.

6. The method of claim 4, wherein the current control gain is dependent on the conduction mode of the motor winding.

7. The method of claim 1, wherein the plurality of conduction modes includes at least one of: (i) a discontinuous charging mode; (ii) a boundary charging mode; and (iii) a continuous charging mode.

8. A system for transferring charge between a first battery and a second battery of an electric vehicle, comprising:

a charging circuit including the first battery, the second battery and a motor winding;

a processor configured to:

determine a desired reference current of the motor winding, a first voltage of the first battery and a second voltage of the second battery;

calculate a power loss for each of a plurality of conduction modes of the motor winding based on the desired reference current, the first voltage and the second voltage, wherein each of the plurality of conduction modes transfers charge between the first battery and the second battery;

select a conduction mode from the plurality of conduction modes that has a least power loss;

establish a duty cycle parameter for the selected conduction mode; and apply the conduction mode and the duty cycle parameter to the charging circuit to transfer the charge.

9. The system of claim 8, wherein the processor is further configured to calculate the power loss for each of the plurality of conduction modes at a plurality of cycle frequencies for a switching cycle and select the conduction mode and the cycle frequency at which the least power loss occurs.

10. The system of claim 8, wherein the processor is further configured to apply a voltage gain to a difference between a reference voltage and a feedback voltage, wherein the voltage gain is dependent on the conduction mode.

11. The system of claim 8, wherein the processor is further configured to use a lookup table to determine a modified reference current and a current control gain, based on the desired reference current, the first voltage and the second voltage.

12. The system of claim 11, wherein the processor is further configured to determine a difference between the modified reference current and a feedback current and apply the current control gain to the difference to establish the duty cycle parameter.

13. The system of claim 11, wherein the current control gain is dependent on the conduction mode.

14. The system of claim 8, wherein the plurality of conduction modes includes at least one of: (i) a discontinuous charging mode; (ii) a boundary charging mode; and (iii) a continuous charging mode in a motor winding current.

15. An electric vehicle, comprising:

a charging circuit including a first battery, a second battery and a motor winding;

a processor configured to:

determine a desired reference current of the motor winding, a first voltage of the first battery and a second voltage of the second battery;

calculate a power loss for each of a plurality of conduction modes based on the desired reference current, the first voltage and the second voltage, wherein each of the plurality of conduction modes transfers charge between the first battery and the second battery;

select a conduction mode from the plurality of conduction modes that has a least power loss;

establish a duty cycle parameter for the selected conduction mode; and apply the conduction mode and the duty cycle parameter to the charging circuit to transfer the charge.

16. The electric vehicle of claim 15, wherein the processor is further configured to calculate the power loss for each of the plurality of conduction modes at a plurality of switching cycle frequencies for a switching cycle and select the conduction mode and the switching cycle frequency at which the least power loss occurs.

17. The electric vehicle of claim 15, wherein the processor is further configured to apply a voltage gain to a difference between a reference voltage and a feedback voltage, wherein the voltage gain is dependent on the conduction mode.

18. The electric vehicle of claim 15, wherein the processor is further configured to use a lookup table to determine a modified reference current and a current control gain, based on the desired reference current, the first voltage and the second voltage.

19. The electric vehicle of claim 18, wherein the processor is further configured to determine a difference between the modified reference current and a feedback current and apply the current control gain to the difference to establish the duty cycle parameter.

20. The electric vehicle of claim 18, wherein the current control gain is dependent on the conduction mode of the motor winding.

* * * * *